United States Patent [19]

Weeks

[11] Patent Number: 4,647,497
[45] Date of Patent: Mar. 3, 1987

[54] COMPOSITE NONWOVEN SHEET
[75] Inventor: Gregory P. Weeks, Newark, Del.
[73] Assignee: E. I. Du Pont de Nemours and Company, Wilmington, Del.
[21] Appl. No.: 742,252
[22] Filed: Jun. 7, 1985
[51] Int. Cl.[4] ............................................ B32B 27/00
[52] U.S. Cl. .................................. 428/284; 428/286; 428/287; 428/288
[58] Field of Search ................ 428/284, 286, 287, 288

Primary Examiner—Marion C. McCamish

[57] ABSTRACT

A composite nonwoven sheet is provided having a polyolefin synthetic pulp layer, optionally containing woodpulp and adhesive binder, is adhered by adhesive binder to a continuous filament scrim. The pulp surface of the composite has unexpectedly high abrasion resistance.

11 Claims, 1 Drawing Figure

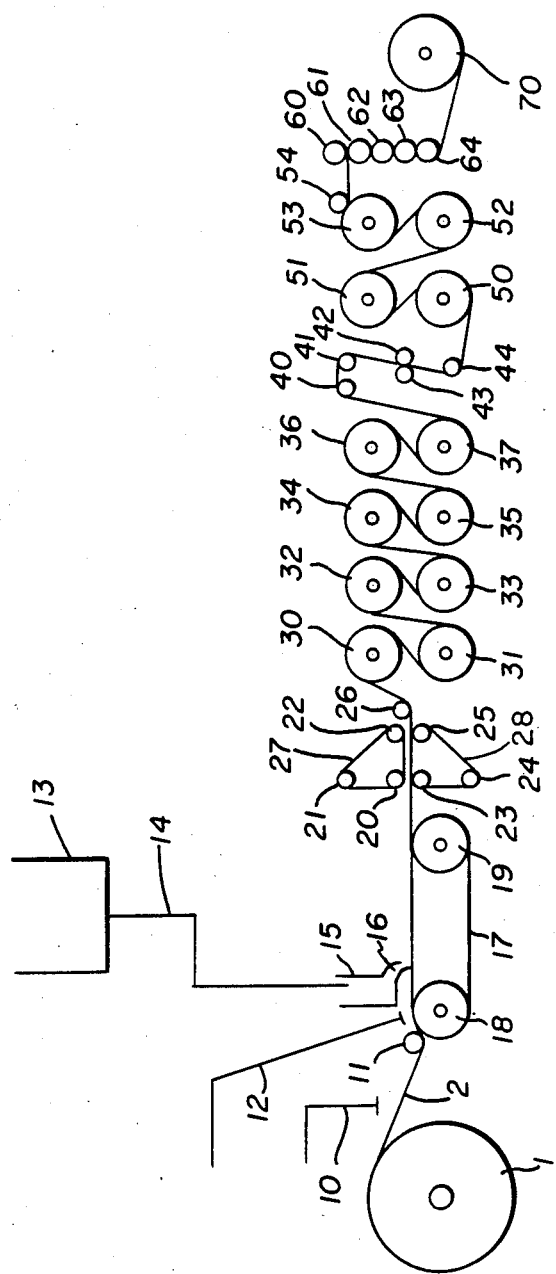

COMPOSITE NONWOVEN SHEET

BACKGROUND OF THE INVENTION

1. Field of the Invention

This invention relates to a sheet structure which includes a layer of polyolefin synthetic pulp. More particularly, the invention concerns a calendered composite sheet which includes a scrim of continuous filaments adhered to the layer comprising the polyolefin synthetic pulp.

2. Description of the Prior Art

Synthetic pulps made from polyolefins, such as polyethylene, polypropylene and blends thereof, are known in the art. *Kirk-Othmer: Encyclopedia of Chemical Technology*, volume 19, third edition, John Wiley & Sons, p. 420–435 (1982) describes synthetic pulps as generally being very fine, highly branched, discontinuous, water-dispersible fibers made from plastics. Known methods for producing the synthetic pulps include solution flash-spinning, emulsion flash-spinning, melt extrusion/fibrillation and shear precipitation. The pulps may be blended with woodpulp or glass fibers or other short fibers and made into papers, sheets or boards by conventional wet-lay papermaking techniques. The pulps may include various additives such as wetting agents (e.g., polyvinyl alcohol), inorganic fillers (e.g., kaolin, clay, talc, calcium carbonate), stabilizers and the like. The polyolefin pulp products so produced may be heated to fuse the polyolefin pulp, and, as disclosed by Hercules Incorporated, Bulletin LT-109 "Pulpex® Polyolefin Pulps for Nonwovens" (March 1982), are suited for use as bonding agents for certain nonwoven materials such as dry-laid, Rando-Webber-formed sheets and wet-laid, Fourdrinier-formed sheets. In such nonwoven materials, the polyolefin pulps are blended with pulps of wood fibers or waste fibers, the polyolefin being in amounts that generally range from 2 to 40% of the total blend. The porosity and bondability of such materials can be controlled by adjusting the temperature and pressure of bonding as well as the fraction of polyolefin pulp included.

The present inventor has found that the utility of the above-described types of synthetic-pulp nonwoven materials is limited. The sheets often lack strength and need considerable improvement in durability and abrasion resistance of the sheet surface. Accordingly, an object of the present invention is to provide a sheet structure wherein the shortcomings associated with polyolefin synthetic pulp sheets are minimized or at least somewhat alleviated.

Many types of composite nonwoven sheets are known in the art. For example, although not related to synthetic pulps, Research Disclosure, 15789 "Reemay® paper composites" (June 1977) discloses that a spunbonded continuous filament polyester nonwoven fabric can be combined with wet-laid wood pulps, staple fibers and resins to form composite sheets. With or without resins, the composite sheets are disclosed to have improved properties relative to the paper, e.g., 4 to 7 times the tear strength, 3 to 4 times the dimensional stability on exposure to moisture, 2 to 4 times the wet strength and improved fold resistance. Also disclosed is the use of adhesive resin within the pulp or as a coating on the continuous filament nonwoven fabric to improve the adhesion of the pulp layer to the nonwoven fabric.

SUMMARY OF THE INVENTION

The present invention provides a calendered composite nonwoven sheet comprising a nonwoven scrim of continuous filaments, preferably of synthetic organic polymer, and an abrasion-resistant pulp layer comprising at least 50% by weight of polyolefin synthetic pulp, the scrim and the pulp layer being adhered to each other by an adhesive binder. Other materials that may be incorporated in the pulp layer include wood pulp, amounting to no more than 50%, and preferably no more than 30%, and most preferably no more than 10% by total weight of the pulp layer, and adhesive binder amounting to no more than 20% and preferably no more than 10% by weight of the pulp layer. Preferred composite sheets of the invention are particularly suited for use as house air-infiltration barriers and outdoor signs and banners. The pulp layers of the composite sheets of the invention exhibit surprisingly greater resistance to surface abrasion than do sheets calendered under the same conditions and made of the same weight and composition of the pulp layer but without the scrim.

BRIEF DESCRIPTION OF THE DRAWING

The invention will be more readily understood by referring to the drawing, which is a schematic representation of equipment suitable for making composite sheets of the invention, and is described in detail in the Examples 1 and 2 below. Briefly, the drawing depicts a web 2 being advanced on a forming wire 17 under outlet 16 of Foudrinier machine headbox 15, from which pulp is deposited onto the web, and then the web and deposited pulp are forwarded, in succession, through a press section (rolls 20–25 and belts 27 and 28), a primary dryer section (cans 30–37), a size press section (rolls 40–44), a secondary dryer section (cans 50–53) and a calender stack (rolls 60–64), and then to a windup to form a roll 70 of composite sheet of the invention.

DETAILED DESCRIPTION OF PREFERRED EMBODIMENTS

The present invention provides a calendered composite nonwoven sheet which includes (a) a continuous filament nonwoven scrim (b) an abrasion resistant synthetic pulp layer and (c) an adhesive binder which adheres the scrim to pulp layer.

A wide variety of nonwoven scrims is suitable for use in the composite sheets of the invention. Depending on the strength characteristics desired in the final composite sheet, the scrim may be made of randomly deposited or directionally deposited continuous filaments. The filaments may be of synthetic organic polymer or glass. Synthetic organic polymer filaments, especially of polyester, polypropylene or nylon are preferred. Usually, the material used for the scrim layer is bonded, preferably self-bonded, so that a suitable balance of tear and tensile strengths is obtained. Suitable scrims are capable of being saturated by water sprays but also are capable of permitting water to drain readily through it by gravity and/or suction while on a Fourdrinier wire.

The scrims may be of a wide range of unit weights. A weight in the range of 15 to 85 g/m² is suitable. The heavier weights are usually preferred when very high strengths are desired in the final composite. Filaments in the range of 1 to 10 dtex are usually useful, though coarser or finer filaments may be employed. A group of suitable scrims is illustrated in the Example 8.

It is preferred that the scrims contain an adhesive binder, at least on the surface of the filaments that become part of the interface with the polyolefin synthetic pulp layer. The adhesive binder usually amounts to no more than 10% by total weight of the scrim, preferably 3 to 8%. In fabricating the composite sheet, the adhesive binder is preferably added to the scrim before the scrim is combined with the pulp layer. This can be accomplished by a pre-treatment such as gravure coating, doctoring or spraying an adhesive binder latex on the scrim surface.

The pulp layer of the composite sheet of the invention may be made entirely of or comprise at least 50% by weight of polyolefin synthetic pulp. Preferred polyolefins include polyethylene, polypropylene or blends thereof. Polyethylene synthetic pulps are particularly preferred. Generally the synthetic pulp particles have diameters of less than 10 microns. A group of suitable polyolefin synthetic pulps is illustrated in Example 9.

The pulp layer in the composite of the invention may be of a wide range of unit weights. Generally, pulp layers weighing 15 to 70 g/m² are suitable in the composite sheets of the invention. The pulp layer may contain woodpulp amounting to as much as 50% by weight of the layer. However, to obtain high abrasion resistances, woodpulp contents of no more than 30% by weight of the layer are preferred. Most preferred, are woodpulp contents of no more than 10%. The inclusion of woodpulp along with the polyolefin synthetic pulp significantly improves the printability of the pulp layer surface and in manufacture enhances the formation and uniformity of the pulp layer. A wide variety of woodpulps are suitable for use in the present invention, including soft or hardwood pulps commonly used in the paper industry. Very fine wood pulps, such as eucalyptus pulps or highly refined grades of conventional woodpulps are preferred because of superior uniformity of dispersion these provide in the pulp layer. The pulp layer may also contain an adhesive binder amounting to as much as 20% by weight of pulp layer. To obtain high porosities in the composite sheet the adhesive binder in the pulp layer amounts to preferably no more than 10% by weight of the pulp layer.

A wide variety of adhesive binders can be used in the present invention. Because the composite sheets of the invention are usually made by wet-lay papermaking techniques, preferred adhesive binders are thermoplastic resin adhesives which are available as aqueous latexes that can be precipitated readily. It is also preferred that such binders have an activation temperature in the range of 70° to 100° C.; that is low enough to avoid melting of the scrim fibers but sufficient to activate the binder under typical papermaking calendering conditions. A particularly preferred adhesive binder is an ethylene/vinyl acetate copolymer.

All the composite sheets of the invention are calendered. Because they are calendered the adhesive binder forms a strong bond between the pulp layer and the scrim, the particles of the scrim are more firmly bonded to each other and the surface abrasion resistance of the pulp layer is enhanced. Surprisingly, the abrasion resistance of the pulp surface of the composite sheets of the invention are much superior to that of synthetic pulp papers of the same synthetic pulp weight calendered under the same conditions. This advantage of the composite sheets of the invention is reflected by a Taber abrasion resistance that is many times (e.g., 7 to 100 times or more) as great as that of comparison synthetic pulp papers. This unexpectedly large abrasion resistance advantage is demonstrated in Examples 6, 7 and 9.

Preferred calendered composite sheets of the invention is illustrated particularly in Examples 1 and 2. The scrim of such preferred sheets is of continuous filaments of synthetic organic polymer, weighs in the range of 15 to 85 g/m² and contains an adhesive binder amounting to 3 to 8% by total weight of the scrim. The pulp layer of the preferred sheets weighs in the range of 15 to 70 g/m² and comprises by total weight of the layer at least 70% polyolefin synthetic pulp, up to 30% woodpulp and up to 20% adhesive binder. In preferred calendered composite sheets of the invention particularly suited for use as house air-infiltration barriers, as illustrated in Example 1, the scrim weighs in the range of 25 to 50 g/m², the pulp layer weighs in the range of 15 to 30 g/m² and has a woodpulp content in the range of 3 to 10% and the composite sheet has a strip tensile strength of at least 25 Newtons, a grap strength of at least 75 Newtons, a hydrostatic head of at least 25 cm and a moisture vapor transport of at least 400 g/m²/day. In preferred calendered composite sheets of the invention particularly suited for outdoor signs and banners, as illustrated in Example 2, the scrim weighs in the range of 30 to 60 g/m² and has a woodpulp content in the range of 3 to 30% and the composite sheet has grab tensile strength of at least 75 Newtons, an Elmendorf tear strength of at least 5 Newtons and a Mullen burst strength of at least 125 kiloPascals.

Preferred processes by which the invention can be carried out are illustrated and described particularly in Examples 1 and 2, with reference to the attached drawing. Briefly, the preferred process employs a conventional Fourdrinier machine. A scrim of continuous filaments, preferably in the form of a roll of spunbonded sheet of continuous filaments of synthetic organic polymer, and optionally precoated with an adhesive binder and/or an adhesive coagulater, is fed onto the forming wire of the Fourdrinier machine. A furnish slurry is deposited atop the scrim. The slurry includes polyolefin synthetic pulp, an adhesive binder (optional if adhesive resin is precoated on the scrim) and optionally woodpulp. Excess water from the furnish slurry is drained by gravity and/or suction through the scrim and forming wire. The thusly formed composite is dewatered further in a press section of the machine and then dried by passage over heated drier cans. The dried composite is then calendered under load. The drying and/or calendering conditions are sufficient to activate the adhesive binder. The calendered composite sheet is then wound up into a roll.

The various characteristics and properties of the synthetic pulps and composite sheets referred to herein are measured by the methods described below and listed in Table I. ASTM refers to the American Society of Testing Materials, TAPPI to the Technical Association of Pulp and Paper Industry, AATCC to the American Association of Textile Chemists and Colorists, and INDA to International Nonwovens and Disposables Association.

TABLE I

| SHEET PROPERTY MEASUREMENTS | | |
|---|---|---|
| Characteristics | Test Method | Units |
| General Properties | | |
| Weight | ASTM D-3776-79 | g/m² |
| Thickness | TAPPI T-411 | mm |
| Drapeflex | ASTM D-1388-64 | cm |

TABLE I-continued
SHEET PROPERTY MEASUREMENTS

| Characteristics | Test Method | Units |
|---|---|---|
| Vertical flame | AATCC 34-1969 | mm |
| Opacity | ASTM D-589 | % transmission |
| Strength Properties | | |
| Strip tensile | ASTM D-1682-64 | Newtons |
| Grab tensile | ASTM D-1117 | Newtons |
| Elmendorf tear | ASTM 9-132 | Newtons |
| Trapezoidal tear | Federal Spec. CCC-T-191b-5136 | Newtons |
| Tonque tear | ASTM D-2261-64T | Newtons |
| Seam tear | ASTM D-1683-81 | Newtons |
| Finch tear | ASTM 827-47 | Newtons |
| Mullen burst | ASTM D-1117-74 | kiloPascals |
| Barrier Properties | | |
| Hydrostatic head | AATCC 127-77 | cm |
| Frazier air permeability | ASTM D-737-46 | $m^3/m^2/min$ |
| Gurley-Hill porosity | TAPPI T-460 M-49 | sec/100 $cm^3$/ 6.45 $cm^2$ |
| Moisture vapor transport | TAPPI 448 M-49 | $g/m^2/24$ hr |
| Mason jar test | INDA IST 80.7-70 | % Pass |
| Spray rating | AATCC 22-1977 | % |
| Taber abrasion | ASTM D-1175-64T | cycles |

The above-listed abrasion measurement is made with a Taber Model 174 abrader having a CS-10 abrader wheel and no weights on the abrader arm (unless otherwise indicated as a 500-gram weight). The end point of the test is judged to occur when the pulp layer is penetrated by the abrader wheel. A small, soft-haired brush is used to remove abraded dust from the sample in lieu of the ASTM-recommended vacuum.

The characteristics recorded herein for the polyolefin synthetic pulps include (a) the drainage factor, which is measured in accordance with TAPPI T-221-SU-72, modified as described in U.S. Pat. No. 3,920,507 (b) fiber retain is the percent of the synthetic polyolefin pulp in a furnish that is retained on a 100 mesh screen, which is measured in accordance with the Bower-McNett Fiber Length Classification test, TAPPI T-23305-75, (c) surface area, which is measured in $m^2/g$ in accordance with the nitrogen gas absorption method of ASTM D-1388-64, and (d) pulp dimensions, which are those reported in microns by the pulp vendors and generally determined in accordance with TAPPI T-233-SU-64.

The examples which follow illustrate the fabrication of a variety of composite sheets of the invention. The composite sheet of Example 1 is suitable for use as a home air-infiltration barrier; that of Example 2, for use in outdoor signs and banners; that of Examples 3 and 4, as commercial mail envelopes; and that of Example 5, as medical operating room drapes. Example 6 demonstrates the advantageous surface abrasion resistance of composite sheets of the invention under various calendering conditions. Example 7 shows the effects on abrasion resistance of woodpulp addition to the synthetic pulp layer. Examples 8 and 9 respectively illustrate the invention with different types of continuous filament scrims and with different types of polyolefin synthetic pulps. Conventional papermakers equipment was used in all examples. The composite sheets of Examples 1–5 were made with a Fourdrinier machine and the sheets of Examples 6–9 were made with a papermakers handsheet mold. In the Examples, all percentages, unless otherwise stated, are by weight.

EXAMPLE 1

In this example, equipment of the type illustrated in the attached drawing was used to prepare a composite sheet of the invention that was particularly suitable for use in house construction as an air infiltration barrier. The composite sheet was made from a scrim and a pulp furnish. The scrim was in the form of a spunbonded polyester continuous filament web which had been pretreated on one surface with a thermoplastic resin latex. The pulp furnish included a polyethylene synthetic pulp, woodpulp and a thermoplastic latex binder.

A continuous filament spunbonded web, Reemay ® 2015 (sold by E. I. du Pont de Nemours and Company, Wilmington, Del.), weighing 37.3 $g/m^2$ (1.1 oz/yd$^2$) and composed of thermally bonded, polyester filaments was the starting material for the scrim. The web had a thickness of 0.23 mm (0.009 inch) and a Frazier air permeability of 200 $m^3/m^2$/min at 1.27-cm head of water (665 $ft^3/ft^2$/min at 0.5 inch of water). The web was provided as a roll wound on a 17.8-cm (7-inch) diameter core and measuring 3.96-meter (156-inch) wide and 1 meter in diameter. The web was fed on a tenter frame at 40 meters per minute under a uniform fine mist spray of Elvace ® 1875 thermoplastic ethylene/vinyl acetate copolymer aqueous latex (sold by Reichhold Chemical Corporation, Dover, Del.) that had been diluted from a nominal 55% solids to 10% solids. The sprayed web was then advanced through a forced air oven operating with an air temperature of 176° C. (350° F.) to dry the web. The web was then wound up. A 5% dry resin add-on (based on the weight of the polyester filament-scrim was obtained. The resin was concentrated on the surface filaments of the treated surface. The Frazier air permeability of the scrim was substantially the same before and after the resin add-on.

The resin-treated web 2 (numeral designations refer to the drawing) was unwound from roll 1 and advanced under the headbox 15 of a conventional 4.6-meter (180-inch) wide Fourdrinier machine. Upstream of the headbox, the sheet passed through water spray 10, which thoroughly wetted the sheet. The wetted sheet was passed under guide-and-tensioning roller 11 and then under headbox 15 and its outlet 16 onto forming wire 17, which was driven by roll 18 and suction roll 19. The web, with pulp deposited thereon from headbox outlet 16, as described in the next paragraph, was then forwarded, in succession, through the press section of the machine (indicated by rolls 20 to 25 and belts 27 and 28), under guide roll 26 to the primary dryer section (indicated by cans 30 to 37—felts which hold the web to the cans are not shown), to the size press section (indicated by rolls 40 to 44), to the secondary dryer section (indicated by cans 50 to 53), under roll 54 and through a calender stack (indicated by rolls 60 to 64), to windup as a roll 70 of composite sheet of the invention.

The furnish which was fed through headbox outlet 16 onto web 2 and formed the pulp layer was prepared as follows in a conventional paper-machine beater. Five-hundred kilograms (1100 lbs) of Pulpex ® E-A polyethylene synthetic pulp (sold by Hercules Corporation, Wilmington, Del.) having a wet lap weight of 1326 kg (2917 lb) including a, 62.3% moisture content, was added to 18.9 kiloliters (5,000 gal) of water in a 37.8 kiloliter (10,000 gal) capacity beater system and blended for 20 minutes. Then, 27.3 kg (60 lb) of eucalyptus woodpulp was added and the furnish was blended for an additional 20 minutes. The pH of the furnish was then adjusted to 7.5 by adding a small amount of soda of silicate. To this blend was added 113.5 kg (250 lb, 30 gal) of Latiseal® A7922A an ethylene/vinyl acetate copolymer latex binder (sold by Pierce and Stevens Chemical Corporation, Buffalo, N.Y.) having a solids content of 42%. Agitation and blending were continued for 10 minutes. Then, to slowly precipitate and set the latex, 9 kg (20 lb) of papermakers alum, as a 5% aqueous solution, was added. Another 13.6 kg (30 lb) as a 20% solution was added to assure complete precipitation of the latex. Then more water was added so that the solids content of the furnish was reduced to 2.5%. This furnish solids consisted of 86.9% polyethylene synthetic pulp, 4.8% eucalyptus woodpulp and 8.3% ethylene/vinyl acetate copolymer latex binder resin. This furnish was then transferred to feedchest 13 of the Fourdrinier machine and further diluted to 1% solids.

The dilute furnish was fed via pipe 14 to headbox 15 through a conventional water recirculation loop (not shown). Flows were adjusted to produce a 0.2% solids content in headbox 15. A solution of 22.7 kg of Gendriv® cationic guar derivative, a viscosity enhancer (sold by Henkel Corporation, Minneapolis, Minn.) in 1.89 kiloliters of water (50 lb in 500 gal) was injected ahead of the headbox at a rate of 11.3 liters/min (3 gal/min) to aid furnish deposition uniformity. Forming wire speed was adjusted to 45.6 meters/min (150 ft/min). Furnish flow through headbox outlet 16 onto web 2 was adjusted to provide a dry solids furnish coating weight of 20.3 g/m². Furnish was thus deposited from the headbox onto the upper surface of the spun-bonded continuous filament scrim. Excess water was drained first by gravity and then by suction as the web and deposited material advanced with the forming wire. The thusly formed composite was then fed from the wire through the press section to the primary dryer section where the dryer rolls were internally heated by steam, so that each drum was a little hotter than the preceding one. The first roll 30 was heated with steam at 107° C. (225° F.) and the last roll 37 at 121° C. (250° F.) which brought the temperature of the surface of the pulp layer of the composite sheet to about 95° C.

The surface of the composite was then treated further by passage through the size press. In the size press, a solution made from 45.4 liters (12 gal) of Quilon®C, a water repellent (sold by E. I. du Pont de Nemours and Company, Wilmington, Del.) diluted in 2270 liters (600 gal) of water was applied to the composite sheet. The sheet was then redried to a moisture content of less than 3% by passage over steam-heated rolls 50-53 of the secondary drier section.

The composite was then calendered by passage through a four-nip calender stack (represented by rolls 60-64) which operated with a load of 71.5 kg/linear cm (400 lb/in). The composite was finally wound up into a roll 70.

The properties of the thusly fabricated composite sheet were as follows.
Unit weight: 57.6 g/m² (1.7 oz/yd²)
Furnish solids: 35% of sheet weight
Thickness: 0.127 mm (0.005 inch)
Strip tensile:
 Longitudinal (MD) 44,5 N (10 lb.)
 transverse (XD) 35.6 N (8 lb.)
Grab tensile:
 MD 138 N (31 lb.)
 XD 116 N (26 lb.)
Elmendorf tear:
 MD 10.7 N (2.4 lb.)
 XD 12.0 N (2.7 lb.)
Tonque tear:
 MD 18.2 N (4.1 lb)
 XD 13.8 N (3.1 lb)
Hydrostatic head: 36–43 cm
Gurley porosity: 9–13 sec/100 cm³/6.45 cm²
Moisture vapor transport: 650 g/m²/day
 Taber abrasion: 30 cycles
 Spray impact rating: 90%
 Ultraviolet light stability: No loss in physical properties in two months of outdoor exposure.

EXAMPLE 2

This example illustrates fabrication of a composite sheet of the invention which was useful for outdoor signs and banners.

A 1.52-meter (60-in) wide roll of Reemay® 2016 spunbonded polyester filament web having a thickness of 0.23 mm (0.009 inch), a Frazier permeability of 158 m³/m²/min (525 ft³/ft²/min) and a nominal weight of 44 g/m² (1.3 oz/yd²) had a 25% solids solution of Elvace® 1875 latex resin applied to one surface of the web by means of a direct coating gravure roll having 27.6 lines/cm (70/inch). The polyester web was coated and dried at 50 m/min and achieved a 5% dry resin add-on. Substantially all the dry resin was located on the surface filaments of the treated surface of the web.

The treated web was then placed on an unwind stand and passed through a Fourdrinier machine which was operated in the same manner and with the same ingredients of furnish as in Exmample 1, except that 27.2 g/m² of furnish solids was deposited on the scrim and the nip load on the calender was 91 kg/linear cm (200 lb/in). The resultant product was then further calendered off-line on a 1.22-m (48-inch) wide conventional textile calender in a single pass with the pulp side of the composite against the smooth steel roll and the scrim side against the composition roll of the calender. The calendering temperature was 60° C. and the calendering load was 224 kg/linear cm (1250 lb/in). The properties of the final composite were as follows:
Unit weight: 71.3 g/m² (2.1 oz/yd²)
Furnish solids: 37% of sheet weight
Thickness: 0.321 mm (0.0052 inch)
Grab tensile:
 MD 171 N (38.4 lb)
 XD 125 N (28.0 lb)
Elmendorf tear:
 MD 12.4 N (2.78 lb)
 XD 7.3 N (1.64 lb)
Seam Tear:
 MD 166 N (37.2 lb)
 XD 127 N (28.5 lb)
Trapezoidal tear:
 MD 38.3 N (8.6 lb)
 XD 24.9 N (5.6 lb)
Drapeflex:
 MD 8.4 cm
 XD 6.6 cm
Mullen burst: 162 kPa (24.6 psi)
Opacity: 25% transmission Outdoor banners measuring 0.91 by 1.82 meters (3×6 feet) were fabricated in a conventional manner by folding over edges and double seaming to create a channel through which a rope was passed. The ropes were used to support the banners between vertical posts. The banners made from the composites of this example were then field tested and were found to be performing well after more than two months of weathering and exposure to winds of up to 48 km/hr (30 miles/hr).

EXAMPLE 3

This example illustrates the fabrication of a composite sheet of the invention which was suitable for use as mail envelopes.

A scrim/pulp composite sheet was made on a conventional Fourdrinier paper machine using the same processing conditions as in Example 2 including pretreatment of the scrim. The composite consisted of a Reemay® 2014 continuous filament scrim having a weight of 33.9 g/m² (1.0 oz/yd²), a thickness of 0.203 mm (0.008 inch) and a Frazier air permeability of 241 cm³/m²/min (800 ft³/ft²/min). The furnish composition was adjusted to consist of 500 kg Hercules Pulpex® EA, 27.2 kg of eucalyptus woodpulp, 54.5 kg of bleached northern softwood pulp, and 113 kg of Latiseal® A78922A. The head box deposition rate was adjusted to give a pulp coverage weight of 33.9 g/m² (1.0 oz/hd²). The composite was calendered in line through the bottom nip of a conventional calender stack with nip load of 35.7 kg/linear cm (200 lb/in). No other post calendering was used.

The properties of the final composite were as follows:
Unit weight: 69.5 g/m² (2.1 oz/yd²)
Furnish solids: 49% of sheet weight
Thickness: 0.254 mm (0.010 inch)
Strip tensile:
  MD 41.4 N (9.3 lb)
  XD 33.4 N (7.5 lb)
Grab tensile:
  MD 128 N (28.8 lb)
  XD 119 N (26.7 lb)
Elmendorf tear:
  MD 5.4 N (1.22 lb)
  XD 4.1 N (0.92 lb)
Mullen burst: 168 kPa (24.4 psi)
Drapeflex:
  MD 7.8 cm
  XD 7.0 cm
Taber abrasion: 50 cycles
Opacity: 21% transmission Manual tearing of a folded edge of the composite sheet is a conventional rapid trade test of the sheet as a reinforced paper envelope. The composite sheet of this example exhibited excellent resistance to tear initiation. When tear was initiated and continued, the sheet tore as an integral composite rather than by delamination of the pulp layer from the scrim.

EXAMPLE 4

This example also illustrates the fabrication of a composite sheet of the invention that is useful for envelopes. In contrast to the preceding example, the pretreatment of the continuous filament scrim was performed in-line with the papermaking equipment.

Substantially the same process conditions as were used in Example 2 were employed in this example. The scrim consisted of a 152-cm (60-inch) wide Reemay® 2014 continuous polyester filament spunbonded web; the scrim was latex-coated in line as described in the next paragraph; and the furnish solids were made up of 64% Pulpex® EA, 18% northern softwood pulp, 9% eucalyptus woodpulp and 9% Latiseal® A7922A. The deposition rate at the head box was adjusted to give a 40.7 g/m² (1.2 oz/yd²) pulp furnish solids coverage.

The latex precoating of the scrim was performed as follows. A 3% paper-makers alum solution was applied, instead of water at the scrim prewetting sprays (numeral 10 in the drawing) just prior to the headbox to thoroughly prewet the scrim with alum solution. Alum solution was applied at a rate of 54.6 liters/min (14.5 gal/min) with the scrim advancing at a rate of 45.6 m/min (150 ft/min). Between the alum solution prewetting and the headbox a 2% aqueous solution of Latiseal® A 7922A was sprayed (designated 12 in the drawing) at a rate of 0.1 liter/m² onto the scrim. The pH of the latex solution was adjusted to be alkaline to ensure that the latex did not coagulate until it contacted the alum-solution-soaked scrim. Upon contacting the scrim, the latex was rapidly coagulated by the alum. The Reemay® having been thus treated, then advanced immediately onto the forming wire of the paper machine where the synthetic pulp, woodpulp and latex of the furnish were deposited on the scrim surface and the excess water was drained from the furnish as in preceding examples. The composite was dried, treated with repellent Quilon® C, redried and calendered through four nips of a calender stack as in preceding examples.

The properties of the resultant composite sheet were as follows:
Unit weight: 76.3 g/m² (2.3 oz/yd²)
Thickness: 0.15 mm (0.006 inch)
Strip tensile:
  MD 45.5 N (10.2 lb)
  XD 35.6 N (8.0 lb)
Grab tensile:
  MD 154 N (34.5 lb)
  XD 134 N (30.0 lb)
Elmendorf tear:
  MD 19.6 N (4.4 lb)
  XD 15.1 N (3.4 lb)
Mullen burst: 43.4 kPa (6.3 psi)
Hydrostatic head: 60 cm
Gurley porosity: 18 seconds/100 cm³/6.45 cm²
Moisture vapor transport: 696 g/m²/24 hr.
Taber abrasion: 70 cycles The adhesion between the pulp layer and scrim was so strong that the layers could not be separated without destroying the integrity of the individual layers.

EXAMPLE 5

This example illustrates the fabrication of composite sheets of the invention which are suitable for use as medical operating room drapes.

A composite sheet of the invention was made under the processing conditions as in Example 2, except for the calendering conditions. However, the starting scrim in this example was Reemay® 2006 spunbonded polyester continuous filament web having a weight of 20.4 g/m² (0.6 oz/yd²), a thickness of 0.165 mm (0.0065 inch) and a Frazier permeability of 301 m³/m²/min (1000 ft³/ft²/min). The furnish composition was the same as that of Example 1. The composite sheet was in-line calendered under the same conditions as were used in Example 3. The composite was further emboss-calendered by passing the composite fabric through a nip formed by a composition roll and a steel roll engraved with a fine linen weave pattern. The pulp layer of the composite sheet contacted the engraved steel roll. Embossing calender nip load was 26.8 kg/cm (150 lb/in). A linen weave pattern was thereby embossed on the pulp surface of the composite sheet without destroying the integrity of the pulp layer.

The properties of the thus produced composite sheet of the invention were:

Unit weight: 48.6 g/m² (1.4 oz/yd²)
Furnish solids: 56% of sheet weight
Thickness: 0.152 mm (0.006 inch)
Grab tensile:
  MD 69 N (15.6 lb)
  XD 44 N (9.85 lb)
Elmendorf tear:
  MD 8.2 N (1.84 lb)
  XD 3.9 N (0.88 lb)
Seam Strength:
  MD 88 N (19.7 lb)
  XD 56 N (12.6 lb)
Taber Abrasion: 40 cycles
Drape flex:
  MD 9.75 cm
  XD 6.72 cm
Opacity: 12.2% transmission
Hydrostatic head: 28 cm
Mason jar test: 100%
Gurley porosity: 5 seconds/100 cm³/6.45 cm²
Vertical flame test:
  MD 71 mm
  XD 67 mm

EXAMPLE 6

This example illustrates the unexpectedly large improvement in abrasion resistance provided by composite sheets which include a polyolefin synthetic pulp layer in accordance with the invention over a known type of sheet structure made with the same composition and weight polyolefin synthetic pulp for a series of calendering conditions.

Hand-sheet samples of resin-pretreated spunbonded polyester continuous filament having a 33.9 g/m² (1.0-oz/yd²) layer of Hercules Pulpex ® EA polyethylene synthetic pulp deposited thereon were prepared in the following manner. Four hundred milliliters of tap water was placed in a 1-liter capacity Waring blender. The quantity of synthetic pulp required to achieve the desired dry add-on weight on a hand sample of 20.3 by 20.3 cm (8 by 8 inch) was calculated from the moisture content of the various pulp samples provided in wet lap form. Thus 3.12 grams of Pulpex ® EA wet lap containing 44.9% solids had to be added in order to achieve 33.9 g/m² (1 oz/yd²) add-on. The required weight of synthetic pulp wet lap was added to the water in the blender and agitated at full speed for 60 seconds. This provided the required furnish. A sheet of Reemay ® 2014 spunbonded polyester which had been precoated on one side with Elvace ® 1875 by the method of Example 2 and having the scrim properties indicated in Example 3 was placed resin-coated side up on a 16-mesh screen at the base of a 20.3×20.3 cm (8×8 inch) hand sheet mold. The sheet mold was filled to a height of 36 cm with tap water and the furnish from the Waring blender was added at the top of the mold. In the mold, the thusly diluted furnish was agitated by hand with a stirrer until a uniform appearing slurry was achieved, at which time the slurry was immediately drained through the scrim and screen, thereby achieving a uniform laydown of the synthetic pulp furnish on the scrim. The scrim/synthetic pulp composite sheet was then reoved from the mold and dried in a forced air oven with 90° C. air for a half hour. The dried sample was then dipped in a 2% aqueous solution of Quilon ® C repellent and redried in a forced air oven with 80° C. air. Finally, the samples were calendered in one pass on a 122-cm (48-in) wide textile calender, having a smooth steel roll and a composition roll. In the calender the pulp surface of the composite sheet was in contact with the steel roll at the temperature and loads indicated below in Table II.

Control pulp-paper hand sheets weighing 33.9 g/m² (1 oz/yd²) were made by the procedures described in the preceding paragraph, except that (1) the pulp furnish of the controls was deposited on Reemay ® which had not been precoated with Elvace ®, (2) the pulp layer of each control was separated from the Reemay ® scrim, after the treatment with 2% Quinlon ® C solution, and (3) only the separated pulp layer was calendered. In this way, properties of the calendered scrim/pulp composite hand sheets of the invention could be compared directly with calendered pulp sheet of the same weight and composition as was used in forming the scrim/pulp composite.

The results of Taber abrasion tests on the pulp surface of the composite sheets of the invention and corresponding controls are shown in Table II.

TABLE II

|  | Test No. | | | |
|---|---|---|---|---|
|  | 6a | 6b | 6c | 6d |
| Calendering |  |  |  |  |
| Load, kg/cm | 112 | 224 | 224 | 224 |
| (lb/in) | 625 | 1,250 | 1,250 | 1,250 |
| Temperature, °C. | 60 | 60 | 80 | 100 |
| Taber Cycles |  |  |  |  |
| Sample Composite | 81 | 150 | 200 | 1,110 |
| Control Paper | 11 | 5 | 8 | 14 |
| Ratio | 7.4 | 30 | 25 | 79 |

Note that the pulp layers of the composite sheets of the invention in this series of tests possessed Taber abrasion resistances that were about 7 to 80 times as great as those possessed by the control pulp papers of the same pulp weight calendered under the same conditions.

EXAMPLE 7

In this example hand samples of composite sheets were made to show the effect of woodpulp content of the pulp layer on the abrasion resistance of the layer. This example also demonstrates the abrasion-resistance advantage of the composites of the invention over synthetic pulp control papers.

Composite sheets were made according to the procedures of Example 6 with a Reemay ® 2014 spunbonded polyester scrim and with pulp layers that were mixtures of Hercules Pulpex ® A-121 polyethylene synthetic pulp and eucalyptus woodpulp. The mixtures were formed by blending the synthetic pulp and woodpulp at the desired ratios in the Waring blender. The same drying and finishing steps as in Example 6 were employed. The sheets were calendered in one pass between rolls heated to 60° C. under a nip load of (a) 224 kg/linear cm (1,250 lb/in) and (b) 112 kg/cm (625 lb/in). Control synthetic pulp/wood pulp sheets were made by the same procedures as the controls of Example 6. The controls had the same composition and 33.9 g/m² (1 oz/yd²) weight as the pulp layer of the composite sheets and were calendered under the same conditions. The following table summarizes the results of Taber abrasion measurements on the samples and controls.

TABLE III

Taber Abrasion Cycles to Failure

| | Composite Sheet | | Control Sheet | |
|---|---|---|---|---|
| Calendering load, kg/cm (lb/in) | 224 (1250) | 112 (625) | 224 1250 | 112 (625) |
| Synthetic pulp to wood pulp ratio | | | | |
| 100:0 | 85 | 51 | 15 | 2 |
| 75:25 | 120 | 26 | 13 | 2 |
| 50:50 | 80 | 20 | 12 | 3 |
| 25:75 | 37 | 14 | 8 | 3 |
| 0:100 | 16 | 9 | 1 | 1 |

Note that at each nip load and pulp composition the composite sheets exhibit a surprisingly large advantage over the corresponding control pulp sheets and that the abrasion resistance generally decreases with increases in wood pulp concentration, especially with woodpulp contents of greater than 50%. The data show that for high abrasion resistance, a polyolefin synthetic pulp content of at least 75% is preferred.

EXAMPLE 8

In this example four different bonded continuous filament scrims are used for the fabrication of composite sheets of the invention by the procedures of Example 6. Hercules Pulpex® A-121 polyethylene pulp was used as the synthetic pulp constituent with a total dry furnish add-on to the scrim of about 33.9 g/m² (1 oz/yd²). The bonded continuous filament scrims were (a) Reemay® 2014 spunbonded polyester (b) Reemay® 2214 spunbonded polyester, (c) Typar® 3121 spunbonded polypropylene (sold by E. I. du Pont de Nemours and Company) and (d) Cerex® nylon 66 (sold by Monsanto Company, St. Louis, Mo.). The scrims were precoated on one surface with Elvace 1875 resin by floating a hand sample of the scrim face down for a moment on an aqueous solution containing 10% by weight of Elvace solids to achieve about 50% wet pick-up. After drying in an oven at 80° C., the dry add-on of Elvace amounted to about 5% by weight of the scrim. The final composites were calendered as in Example 1 on a 122-cm (48-inch) wide calender, under a nip load of 224 kg/linear cm (1250 lb/in) with roll temperatures at 60° C. Table IV summarizes the properties of the scrims and the final composites.

TABLE IV

| | Test No. | | | |
|---|---|---|---|---|
| | 8a | 8b | 8c | 8d |
| Scrim Properties | | | | |
| Type | Reemay® | Reemay® | Typar® | Cerex® |
| dtex | 4.4 | 2.4 | 11.1 | 4.4 |
| Unit Weight, g/m² | 33.9 | 45.8 | 54.2 | 50.9 |
| Thickness, mm | 0.20 | 0.23 | 0.22 | 0.19 |
| Strip tensile MD/XD, N | 28/20 | 40/44 | 35/37 | 120/67 |
| Grab tensile MD/XD, N | 160/102 | 200/182 | 218/245 | 240/151 |
| Mullen burst, kPa | 117 | 234 | 255 | 372 |
| Frazier permeability, m³/m²/min | 222 | 134 | 126 | 762 |
| Composite | | | | |
| Unit weight, g/m² | 62 | 92 | 88 | 109 |
| % Furnish | 45.3 | 50 | 50 | 53.4 |
| Thickness, mm | 0.12 | 0.14 | 0.22 | 0.22 |
| Strip tensile MD/XD, N | 32/28 | 58/58 | 46/42 | 106/79 |
| Grab tensile MD/XD, N | 107/80 | 142/142 | 182/151 | 243/142 |
| Finch tear, MD/XD, N | 80/58 | 213/151 | 98/134 | 102/111 |
| Mullen burst, kPa | 150 | 178 | 267 | 400 |
| Gurley porosity | 2930 | 1010 | 778 | 1000 |
| Moisture vapor transport, g/m²/day | 559 | 670 | 525 | 670 |
| Taber abrasion, cycles, (500 gm weight) | 71 | 74 | 130 | 60 |

As can be seen from the results shown in Table III, a wide variety of properties can be obtained in the final composite sheet, depending on the starting scrim material.

EXAMPLE 9

This example of various composite sheets of the invention made with different polyolefin synthetic pulps not only illustrates the advantage of composite sheets over pulp papers in abrasion resistance but also demonstrates that certain synthetic pulps have a several fold advantage in producing high air and water barrier properties at light pulp add-ons.

In the same manner as described in Example 6, scrim-pulp composites were formed with Reemay® spunbonded polyester continuous filament scrim and the following polyolefin synthetic pulps.

a. Pulpex® A-121
b. Pulpex® EA
c. Fybrel® R-2005/13020F
d. Pulpex® PAC-C
e. Fybrel® E-380/13038F
f. Pulpex® ED All the Pulpex® pulps are sold by Hercules Corp. and the Fybrel® pulps are sold by Mitsui Petrochemical Industries Ltd., Tokyo, Japan. All of these synthetic pulps are of polyethylene except Pulpex® PAC-C, which is polypropylene. The properties of the pulps and of the resultant composite sheets are summarized in Table V.

TABLE V

| | Test No. | | | | | |
|---|---|---|---|---|---|---|
| | 9a | 9b | 9c | 9d | 9e | 9f |
| Synthetic Pulp | a | b | c | d | e | f |
| Drainage factor | 4.23 | 1.96 | 1.59 | 0.75 | 0.73 | 0.57 |
| Fiber retain | 91 | 93 | 56 | 87 | 57 | 91 |
| Surface area, m²/g | 13.3 | 10.7 | 7.4 | 5.0 | 3.8 | 4.8 |
| Mean diameter, micron | 5 | 10 | 5 | 20 | 10 | 40 |
| Composite (for different pulp add-ons) | | | | | | |
| Gurley porosity | | | | | | |
| 17.0 g/m² | 620 | 25 | 4.4 | 0.8 | 0.5 | 2.0 |
| 33.9 g/m² | 2830 | 396 | 128 | 5 | 5.8 | 22.7 |
| 67.8 g/m² | * | 4760 | 1130 | 29 | 1190 | 96 |
| Hydrostatic head, cm | | | | | | |
| 17.0 g/m² | 118 | 48 | 39 | 34 | 25 | 21 |
| 33.9 g/m² | ** | 90 | 56 | 63 | 70 | 45 |
| 67.8 g/m² | ** | 130 | 102 | 104 | 130 | 102 |
| Taber abrasion, cycles | | | | | | |
| 33.9 g/m² | 500 | 133 | 94 | 21 | 21 | 61 |

TABLE V-continued

| | Test No. | | | | | |
|---|---|---|---|---|---|---|
| | 9a | 9b | 9c | 9d | 9e | 9f |
| Pulp Paper Control | | | | | | |
| Taber abrasion, cycles 33.9 g/m² | 24 | 1 | 1 | 1 | 1 | 1 |

*very high, greater than about 5000 sec/100 cm³/6.45 cm
**very high, greater than about 130 cm.

I claim:

1. A calendered composite nonwoven sheet comprising a nonwoven continuous filament scrim and an abrasion resistant pulp layer comprising at least 50% by weight of polyolefin synthetic pulp, the scrim and the pulp layer being adhered to each other by an adhesive binder.

2. A composite sheet of claim 1 wherein the pulp layer contains woodpulp amounting to no more than 50% by total weight of the pulp layer.

3. A composite sheet of claim 2 wherein the woodpulp amounts to no more than 30% of the pulp layer.

4. A composite sheet of claim 2 wherein the woodpulp amounts to no more than 10% of the pulp layer.

5. A composite sheet of claim 1 wherein the pulp layer contains an adhesive binder amounting to no more than 20% by total weight of the pulp layer.

6. A composite sheet of claim 5 wherein the pulp layer contains an adhesive binder amounting to no more than 10% by weight of the pulp layer.

7. A composite sheet of claim 1 wherein the scrim includes an adhesive binder amounting to no more than 10% by total weight of the scrim.

8. A composite sheet of claim 7 wherein the amount of the adhesive binder is in the range of 3 to 8% by weight of the scrim.

9. A calendered composite nonwoven sheet comprising a nonwoven scrim of continuous filaments of synthetic organic polymer adhered by an adhesive binder to an abrasion-resistant pulp layer comprising a polyolefin synthetic pulp, the scrim weighing in the range of 15 to 85 g/m² and containing an adhesive binder in an amount in the range of 3 to 8% by total weight of the scrim, and the pulp layer weighing in the range of 15 to 70 g/m² and comprising by total weight of the layer at least 70% polyolefin synthetic pulp, no more than 30% woodpulp and no more than 20% adhesive binder.

10. A calendered composite sheet of claim 9 particularly suited for use as a house air infiltration barrier, the scrim weighing in the range of 25 to 50 g/m², the pulp layer weighing in the range 15 to 30 g/m² and having a woodpulp content in the range of 3 to 10%, and the composite sheet having a strip tensile strength of at least 25 Newtons, a grab tensile strength of at least 75 Newtons, a hydrostatic head of at least 25 cm, and a moisture vapor transport of at least 400 g/m²/day.

11. A calendered composite sheet of claim 9 particularly suited for outdoor signs and banners, having the scrim weighing in the range 30 to 60 g/m², the pulp layer weighing in the range of 20 to 40 g/m² and having a woodpulp content in the range of 3 to 30% and the composite sheet has a grab tensile strength of at least 75 Newtons, an Elmendorf tear strength of at least 5 Newtons and a Mullen burst strength of at least 125 kiloPascals.

* * * * *